United States Patent [19]

Miyakawa et al.

[11] Patent Number: 4,757,660
[45] Date of Patent: Jul. 19, 1988

[54] FRONT GLASS MOULDINGS

[75] Inventors: Naohisa Miyakawa, Nagareyama; Syosuke Seto, Daifu, both of Japan

[73] Assignee: Tokiwa Chemical Industries Co., Ltd., Nagareyama, Japan

[21] Appl. No.: 939,436

[22] Filed: Dec. 4, 1986

[51] Int. Cl.$^4$ ............................................. E04B 1/62
[52] U.S. Cl. ......................................... 52/400; 296/93; 296/208
[58] Field of Search ................. 52/397, 400, 208; 296/93, 208, 213, 154

[56] References Cited

U.S. PATENT DOCUMENTS 3,583,757  6/1971  Wilfert ........................ 296/154 X
4,088,366  5/1978  Gallitzendorfer et al. ......... 296/154
4,523,783  6/1985  Yamada ........................ 52/208 X

FOREIGN PATENT DOCUMENTS 59-12714  1/1984  Japan .
60-1002   1/1985  Japan .

Primary Examiner—Carl D. Friedman
Attorney, Agent, or Firm—Wenderoth, Lind & Ponack

[57] ABSTRACT

A front glass moulding which comprises an integrally moulded synthetic resin body having a top and a leg extending downwardly from the top with at least one arm extending outwardly from the surface of the leg both below and in substantially parallel and spaced relationship to the top to define a groove therebetween. The body consists of a central portion and two side portions integrally connected at one end to the adjacent end of the central portion. The central portion is cut along a line extending horizontally below the arm to remove a lower portion of the leg below the arm, and each of the side portions is cut on the undersurface along a line extending upwardly slantingly from the undersurface at the free end of the side portion to the other end thereof where the side portions merge with the central portion.

2 Claims, 3 Drawing Sheets

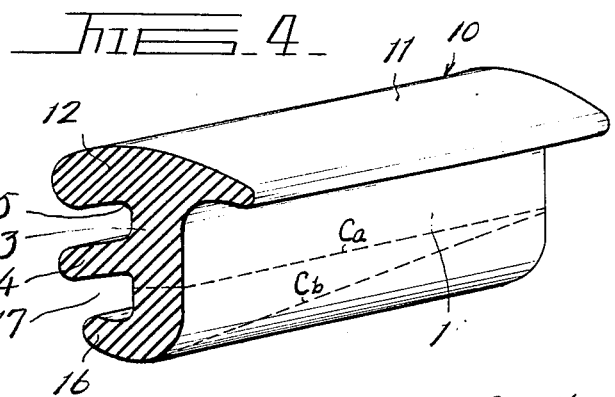
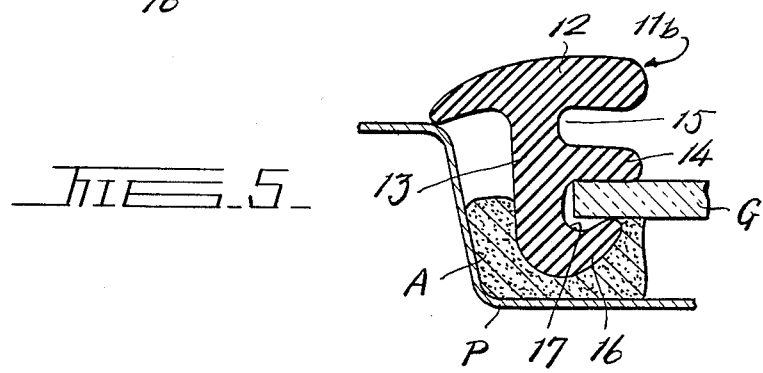
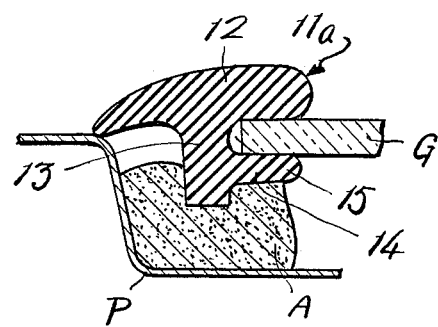
PRIOR ART
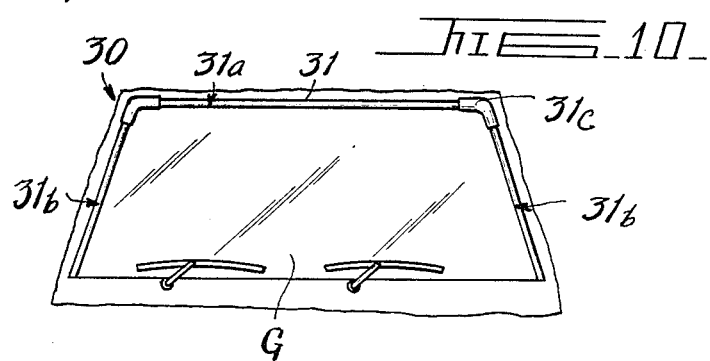

PRIOR ART

FRONT GLASS MOULDINGS

BACKGROUND OF THE INVENTION

This invention relates to front glass mouldings adapted to be employed between the body panels and front glass panes in the front portions of various vehicles and more particularly to front glass mouldings each comprising a single body which integrally has a central portion and side portions.

A variety of front glass mouldings for vehicles have been hitherto proposed and practically employed. In a vehicle of the type in which the vehicular body panel and front glass pane connected together by means of adhesive, the front glass moulding is mounted in the clearance in the boundary between the edge of the opening in the vehicular body panel and the front glass pane to fill the clearance and at the same time present a pleasing external appearance. In one of the recently developed front glass mouldings, the side portions of the front glass moulding each have a front glass pane receiving groove in a lower portion and a rainwater guide in an upper portion in the inner surface of the associated side portion so that rainwater striking against the front glass and scattering about is prevented from penetrating into the vehicle. However, as the moulding having the upper and lower grooves serving as the rainwater guide and glass pane receiving grooves can not be used as the central portion of the moulding, another moulding having only the front glass pane receiving groove has to be employed and connected to the moulding having the upper and lower grooves to be used as the side mouldings by means of corner joints. The conventional front glass moulding comprises three types of components, that is, a central moulding portion, side moulding portions and corner joints connecting between the central and side moulding portions. Thus, the provision of the corner joints at the corners of the front glass moulding presents a disfigured external appearance and the corner joints are vulnerable to damage. Furthermore, since the conventional front glass moulding employs the three types of components, the front glass moulding is expensive.

In order to eliminate the drawbacks inherent in the conventional front glass moulding referred to hereinabove, one has longed for a front glass moulding which can be formed by processing a single moulded preform to provide a central portion and two side portions integral with the central portion for supporting a front glass pane, which eliminates the conventional corner joints for connecting between the central and side portions, which can be easily formed, which presents a fine external appearance and which is rigid in construction.

SUMMARY OF THE INVENTION

Therefore, the present invention has its object to provide a front glass moulding which can effectively eliminate the drawbacks inherent in the conventional front glass moulding.

In order to attain the above-mentioned object, in a first embodiment, the present invention provides a front glass moulding which comprises a single moulded body having a top, a leg downwardly extending from the top, a first arm extending outwardly from the surface of the leg below and in substantially parallel and spaced relationship to the top to define a first groove therebetween, and a second arm extending outwardly from the surface of the leg below and in substantially and spaced relationship to the first arm to define a second groove therebetween. The body consists of a central portion and two side portions connected at one end to the opposite ends of the central portion. The central portion is cut along a line extending horizontally below the first arm to allow removal of the second arm and the side portion is cut along a line extending upwardly slantingly from the undersurface at the free end of the side portion to the other end thereof connected to the adjacent end of the central portion where the second arm of the side portion is completely removed.

In a second embodiment, the present invention provides a front glass moulding which comprises a single moulded body having a top, a leg downwardly extending from the body, a leg extending downwardly from the top, a first arm extending outwardly from the surface of the leg below and in substantially parallel and spaced relationship to the top to define a first groove therebetween, a second arm extending outwardly from the surface of the leg below and in substantially parallel and spaced relationship to the first arm to define a second groove therebetween and a third arm extending outwardly from the surface of the leg below and in spaced relationship to the second arm to define a third groove therebetween. The body consists of a central portion and two side portions connected at one end to the opposite ends of the central portion. The central portion is cut along a line extending horizontally between the second and third arms to allow removal of the third arm and the side portion is cut along a line extending upwardly slantingly from the undersurface at the free end of the side portion to the other end thereof where the side portion is connected to the central portion and has the same thickness as the central portion.

The above and other objects and attendant advantages of the present invention will be more readily apparent to those skilled in the art from a reading of the following detailed description in conjunction with the accompanying drawings which show preferred embodiments of the invention for illustration purpose only, but not for limiting the scope of the same in any way.

BRIEF DESCRIPTION OF THE DRAWINGS

FIG. 4 is a fragmentary perspective view in partial section on a further enlarged scale of the preform for a first embodiment of the front glass moulding according to the present invention;

FIG. 5 is a fragmentary sectional view of one of the side portions of the front glass moulding produced from the preform shown in FIG. 4;

FIG. 6 is a fragmentary sectional view of the central portion of the front glass moulding produced from the preform shown in FIG. 4;

FIG. 10 is a perspective front elevational view of the front portion of an automobile in which a conventional front glass moulding is employed.

PREFERRED EMBODIMENT OF THE INVENTION

Figure 1:
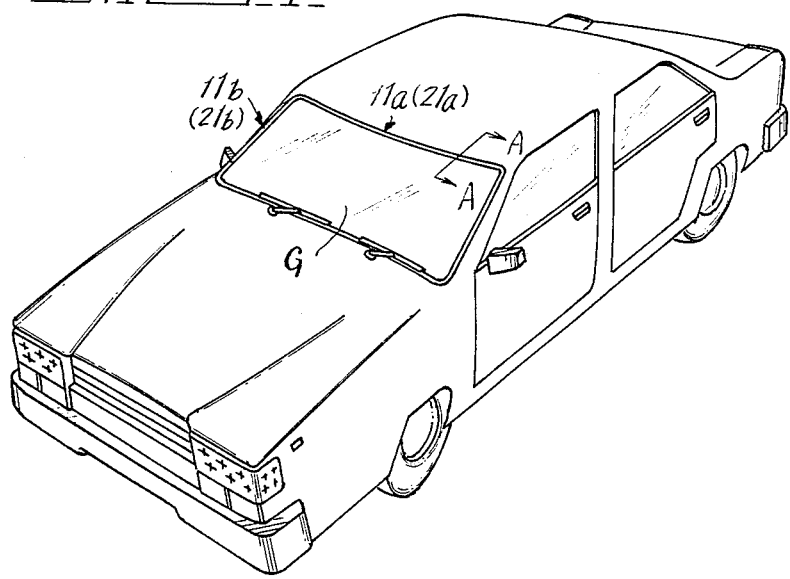
FIG. 1 is a perspective view of an automobile in which the present invention is incorporated.
Figure 2:
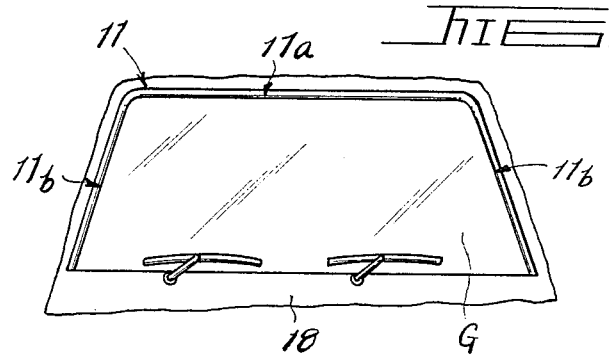
FIG. 2 is a perspective front elevational view on an enlarged scale of the front portion of the automobile shown in FIG. 1 in which the front glass moulding of the invention is employed.
Figure 3:
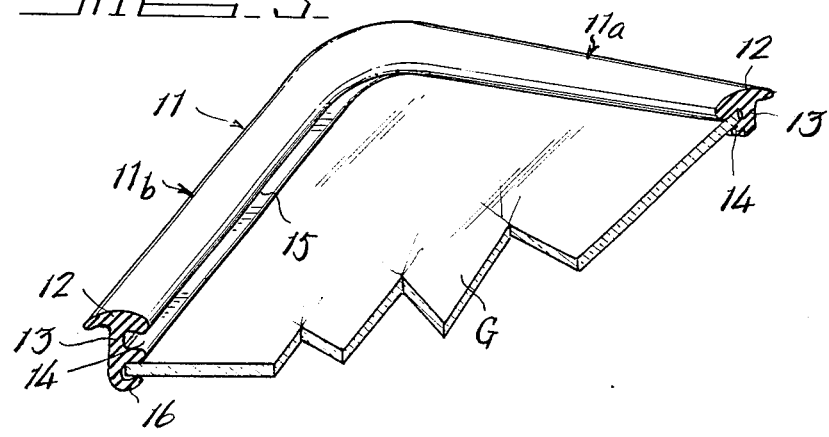
FIG. 3 is a fragmentary perspective view in partial section showing the connection between the moulding of the invention and the front glass pane.

The present invention will be now described referring to the accompanying drawings which show preferred embodiments of the present invention for illustration purpose. First, referring to FIGS. 2 to 6 in which the first embodiment of the front glass moulding of the present invention is shown. The preform for the first embodiment of the moulding is generally shown by reference numeral 10 in FIG. 4 and comprises an integrally formed body 11 made of synthetic resin. The body 11 has a top 12, a leg 13 extending downwardly from the top 12 at a substantially central area of the top, an upper or first arm 14 extending outwardly from the surface of the leg 13 in substantially parallel and spaced relationship to the top 12 to define a groove 15 therebetween. A lower or second arm 16 extends outwardly from the surface of the leg 13 below the upper arm 14 in substantially parallel and spaced relationship to the upper arm 14 to define a groove 17 therebetween. Reference characters Ca and Cb denote horizontal and sloped cutting lines, respectively.

In the production of the first embodiment of the front glass moulding from the preform shown in FIG. 4, the section of the preform forming the central moulding portion of the front glass moulding and the preform sections forming the side portions of the moulding are cut along the cutting lines Ca and Cb, respectively. Thus, the produced front glass moulding consists of the central portion 11a and side portions 11b connected at one end to the respectively adjacent end of the central portion 11a. The central portion 11a includes the groove 15 which serves as the front glass pane receiving groove and the side portions 11b each include the groove 15 which serves as the rainwater guide and the groove 17 as the front glass pane receiving groove, respectively.

With the above-mentioned construction and arrangement of the components of the front glass moulding of the present invention, in use, a front glass pane G is slid along the grooves 17 in the side portions 11b from the free ends of the side portions until the leading edge of the glass pane G is received in the groove 15 in the central portion 11a.

The front glass moulding having the front glass pane G supported therein is then placed into the panel P of the vehicular body with the outer side edge of the top 12 engaging the panel P leaving a space between the panel and the leg 13. A portion of the space between the panel P and the leg 13 is filled with adhesive A to hold the front glass moulding and front glass pane G in position in the vehicular body.

As mentioned hereinabove, according to the first embodiment of the front glass moulding of the present invention, the moulding can be easily and simply formed integrally having the central portion with the front glass pane receiving groove and the side portions with the rainwater guides and front glass pane receiving grooves without the necessity of corner joints between the central and side portions as seen in the conventional vehicular front glass mouldings and thus, the front glass moulding of the present invention has a fine appearance. And since the side portion is cut along the cutting line Cb which extends upwardly slantingly from the undersurface of the lower arm at the outer or free end of the side portion to a position just below the upper arm at the other end of the side portion or the joint between the side and central portions of the front glass moulding, the moulding joint is reduced in thickness and can be easily bent at the joint for mounting of the moulding in the vehicular panel and produced at less expense.

Figure 7:
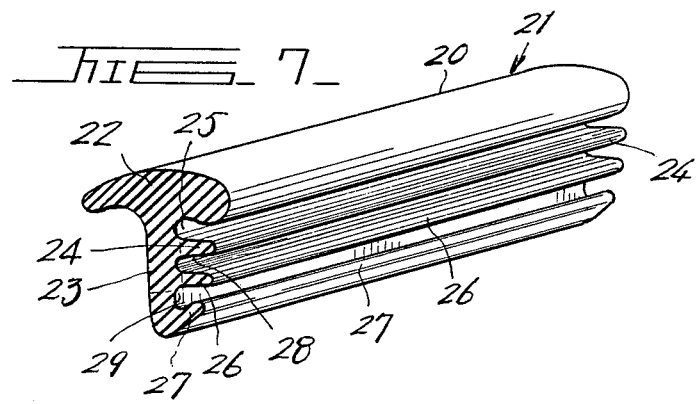
FIG. 7 is a perspective view in partial section of the preform for a second embodiment of the front glass moulding according to the present invention.
Figure 8:
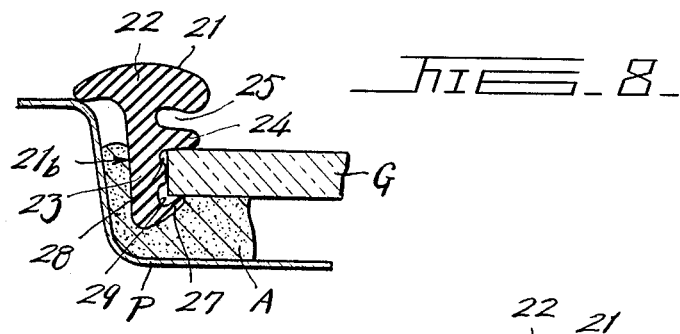
FIG. 8 is a cross-sectional view of one of the side portions of the front glass moulding produced from the preform shown in FIG. 7.
Figure 9:
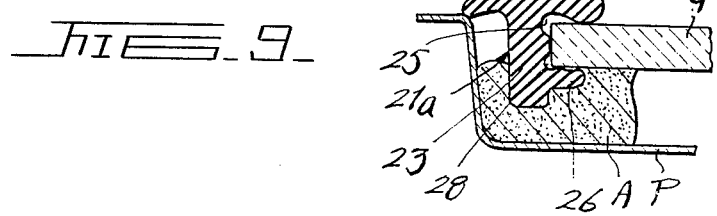
FIG. 9 is a cross-sectional view of the central portion of the front glass moulding produced from the preform shown in FIG. 7.

Now, turning to FIGS. 7 to 9 which show the second embodiment of the front glass moulding of the present invention, the preform for the second embodiment of the front glass moulding is generally shown by reference numeral 20 in FIG. 7 and comprises an integrally formed synthetic resin body 21 which has a top 22 and a leg 23 extends downwardly from the top 22. A first arm 24 extends outwardly from the surface of the leg 23 below and in substantially parallel and spaced relationship to the top 22 to define a first groove 25 therebetween, a second arm 26 extends outwardly from the inner surface of the leg 23 below and in substantially parallel and spaced relationship to the first arm 24 to define a second groove 28a therebetween and a third arm 27 extends outwardly from the surface of the leg 23 below and in substantially parallel and spaced relationship to the second arm 26 to define a third groove 29 therebetween.

The body 21 consists of a section forming the central portion and two sections forming two side portions integrally connected at one end to the opposite ends of the central portion when the preform is utilized as to the front glass moulding as will be described hereinafter.

In the production of the front glass moulding from the preform having the above-mentioned construction and arrangement of the components, the section of the preform forming the moulding central portion is cut at the base end of the first arm 24 and at an area of the leg 23 from where the third arm 27 extends to allow removal of the first and third arms 24 and 27 from the section forming the moulding central portion 21a to thereby provide the moulding central portion 21a with a front glass pane receiving groove defined between the top 22 and second arm 26. Each of the sections of the preform forming the moulding side portions is cut at the base end of the second arm 26 to allow removal of the second arm 26 from the preform section to thereby provide the moulding side portion 21b with a rainwater guide formed by the top 22 and first arm 24 and a front glass pane receiving groove defined between the first and third arms 24 and 27. The undersurface of the side portion 21b is cut along a line which extends upwardly slantingly from the undersurface at the free end of the side portion to the other end thereof, that is, one joint of the front glass moulding where the side portion merges with the central portion 21a. Thus, the other end of the side portion 21b has the same thickness as the central portion 21a at each joint of the moulding.

With the above-mentioned construction and arrangement of the components of the front glass moulding according to the present invention, during use of the second embodiment a front glass pane G is slid along the glass pane receiving grooves in the two side portions 21b from the free ends of the side portions until the leading edge of the front glass pane G is received in the glass pane receiving groove in the central portion 21a.

The second embodiment of the front glass moulding 5 having the front glass pane G supported therein is then placed into the panel P of the vehicular body by bending the moulding at the joints between the central and side portions with the outer side edge of the top 12 engaging the panel P leaving a space between the panel. Then the leg 23 and the space is partially filled with adhesive A to hold the front glass moulding in position in the vehicular body.

As mentioned hereinabove, according to the second embodiment of the front glass moulding of the present invention, the moulding can be easily and simply formed integrally having the central portion with the glass pane receiving groove and the side portions with the rainwater guides and front glass pane receiving grooves from a single preform without the necessity of corner joints between the central and side portions as seen in the conventional vehicular front glass mouldings. Thus, the second embodiment of the front glass moulding also has a fine external appearance. And since the undersurface of the side portion is cut along the cutting line which extends upwardly slantingly from the free end of the portion to the other end thereof where the side portion merges with the central portion, thereby reducing the thickness of the side portion to the extent that the side portion has the same thickness as the central portion, the moulding is reduced in thickness at the joints between the central and side portions and can be easily bent at the joints thereof. Thus, the moulding can be easily mounted in the vehicle and produced at less expense.

Figure 11:
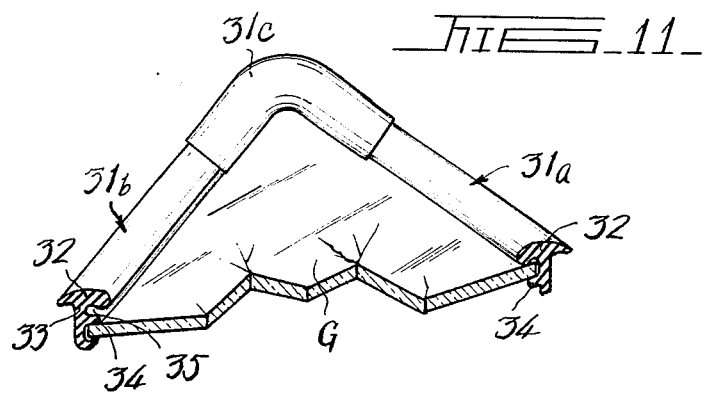
FIG. 11 is a fragmentary perspective view on an enlarged scale in partial section of the conventional front glass moulding shown in FIG. 10.

FIG. 10 shows the front portion of a vehicle in which a conventional front glass moulding is mounted and FIG. 11 shows a portion of the front glass moulding shown in FIG. 10 on an enlarged scale. As shown in FIGS. 10 and 11, the conventional front glass moulding 30 comprises a body 31 which includes a central portion 31a, side portions 31b (only one side portion is shown) connected at one end to the adjacent end of the central portion 31a and corner joints 31c (only one corner joint is shown) connecting between the adjacent ends of the central and side portions 31a and 31b. Thus, the conventional front glass moulding comprises three types of separate parts joined together by means of corner joints as distinguished from the front glass moulding of this invention which comprises a single moulded piece and thus, the conventional moulding is more complicated in construction and expensive as compared with the moulding of the present invention.

The advantages of the present invention, as well as certain changes and modifications of the disclosed embodiments thereof, will be readily apparent to those skilled in the art. It is the inventors' intention to cover by their claims all those changes and modifications of the invention herein chosen for the purpose of the disclosure without departing from the spirit and scope of the invention. Protection by Letters Patent of this invention in all its aspects as the same are set forth in the appended claims is sought to the broadest extent that the prior art allows.

What is claimed is:

1. A front glass moulding for a vehicle comprising:
an integrally moulded synthetic resin body of T-shaped cross-section having a top and a leg extending downwardly from said top;
at least two vertically spaced arms integrally connected to and extending outwardly from said leg, said arms being substantially parallel to and spaced from said top and from each other to define grooves therebetween, respectively;
said body comprising a central portion having the groove defined between the top of said body and one of said arms being a front glass receiving groove, said body further comprising two side portions each being integrally connected at one end thereof to the respective adjacent end of said central portion, and each said side portion having the groove defined between said top of said body and the upper arm of said at least two arms being a rainwater guide, and each of said side portions having the groove defined between adjacent arms of said at least two arms being a front glass receiving groove; and
said central portion having a cut along a line extending substantially horizontally throughout the length of said central portion below said upper arm to allow removal of said lower arm in said central portion, and each of said side portions having a cut along a line extending upwardly slantingly from the under surface of the side portion at the free end thereof to the other end thereof connected to the adjacent one end of said central portion at the position of the end of said horizontal cut, said upwardly slanting cut allowing removal of the portion of said side portion therebelow.

2. A front glass moulding for a vehicle comprising:
an integrally moulded synthetic resin body of T-shaped cross-section having a top and a leg extending downwardly from said top;
at least three vertically spaced arms integrally connected to and extending outwardly from said leg, said arms being substantially parallel to and spaced from said top and from each other to define grooves therebetween, respectively;
said body comprising a central portion, and two side portions each being integrally connected at one end thereof to the respective adjacent end of said central portion;
said at least three arms comprising an upper arm, a middle arm, and a lower arm;
said central portion having a cut along a line extending substantially horizontally throughout the length of said central portion below said middle arm to allow removal of said lower arm in said central portion, and a cut along a line extending substantially throughout the length of said upper arm to allow removal of said upper arm in said central portion, a groove defined between said top and said middle arm being a front glass receiving groove; and
said each of said side portions having a cut along a line extending substantially throughout the length of said middle arm to allow removal of said middle arm in said side portion, a groove defined between said top and said lower arm being a front glass receiving groove, and a groove defined between said top and said upper arm being a rainwater groove.

* * * * *